United States Patent
Watazu et al.

(10) Patent No.: US 9,933,877 B2
(45) Date of Patent: Apr. 3, 2018

(54) PRESSURE SENSITIVE SENSOR AND TOUCH PANEL

(71) Applicant: NISSHA CO., LTD., Kyoto-shi (JP)

(72) Inventors: Yuji Watazu, Kyoto (JP); Naoto Imae, Kyoto (JP); Keisuke Ozaki, Kyoto (JP); Eiji Kakutani, Kyoto (JP); Junichi Shibata, Kyoto (JP)

(73) Assignee: Nissha Co., Ltd., Kyoto-shi (JP)

( * ) Notice: Subject to any disclaimer, the term of this patent is extended or adjusted under 35 U.S.C. 154(b) by 0 days.

(21) Appl. No.: 15/113,947

(22) PCT Filed: Feb. 16, 2015

(86) PCT No.: PCT/JP2015/054096
§ 371 (c)(1),
(2) Date: Jul. 25, 2016

(87) PCT Pub. No.: WO2015/133251
PCT Pub. Date: Sep. 11, 2015

(65) Prior Publication Data
US 2016/0342257 A1  Nov. 24, 2016

(30) Foreign Application Priority Data
Mar. 7, 2014 (JP) .................................. 2014-045129

(51) Int. Cl.
*G06F 3/045* (2006.01)
*G06F 3/041* (2006.01)
(Continued)

(52) U.S. Cl.
CPC ............ *G06F 3/0414* (2013.01); *G01L 1/146* (2013.01); *G06F 3/044* (2013.01)

(58) Field of Classification Search
CPC ......... G06F 2203/04106; G06F 3/0414; G06F 2203/04105; G06F 3/044
See application file for complete search history.

(56) References Cited

U.S. PATENT DOCUMENTS

| | | | | |
|---|---|---|---|---|
| 2013/0257787 | A1* | 10/2013 | White | G06F 3/0414 345/174 |
| 2014/0354905 | A1* | 12/2014 | Kitchens | G06F 1/3215 349/12 |
| 2015/0130742 | A1* | 5/2015 | Chen | G06F 3/044 345/174 |

FOREIGN PATENT DOCUMENTS

| | | |
|---|---|---|
| JP | 63-58121 A | 3/1988 |
| JP | 5-61592 A | 3/1993 |

(Continued)

OTHER PUBLICATIONS

International Search Report dated Apr. 7, 2015 in PCT/JP2015/054096 filed Feb. 16, 2015.

*Primary Examiner* — William Boddie
*Assistant Examiner* — Alecia D English
(74) *Attorney, Agent, or Firm* — Oblon, McClelland, Maier & Neustadt, L.L.P.

(57) ABSTRACT

Problem: To achieve a pressure sensitive sensor capable of suppressing a drop in the accuracy of detecting a pressing force even in cases where the ambient temperature changes.

Resolution means: A pressure sensitive sensor (7) includes: an elastically deformable covering member (10A) covering a front surface side; a variable resistance electrode (42A), electrical resistance thereof changing in response to a change in posture; a pyroelectric material layer (50) disposed covering the variable resistance electrode (42A); and a pair of charge detection electrodes (51, 52) disposed on both sides of the pyroelectric material layer (50) in a layering direction (L).

6 Claims, 8 Drawing Sheets

(51) Int. Cl.
*G06F 3/044* (2006.01)
*G01L 1/14* (2006.01)

(56) References Cited

FOREIGN PATENT DOCUMENTS

| JP | 6-229848 A | 8/1994 |
|---|---|---|
| JP | 2012-13440 | 1/2012 |
| JP | 5689523 B1 | 3/2015 |

\* cited by examiner

PRESSURE SENSITIVE SENSOR AND TOUCH PANEL

TECHNICAL FIELD

The present invention relates to a pressure sensitive sensor that detects a pressing force and a touch panel having a function for detecting a pressing force (a pressure sensitive touch panel).

BACKGROUND ART

A device disclosed in Japanese Unexamined Patent Application Publication No. H05-61592A (Patent Document 1) is known as an example of the above-described pressure sensitive sensor and touch panel. In the device disclosed in Patent Document 1, a flexible touch panel 2 is disposed on a planar pressure sensitive sensor 1 to be in contact with the planar pressure sensitive sensor 1 (see FIG. 1 in Patent Document 1). A sensor including a pressure sensitive sheet 1a constituted of a pressure sensitive resistive sheet or the like is given as an example of the pressure sensitive sensor 1, where a pressing force is detected by detecting a change in a resistance value arising when the pressure sensitive sheet 1a is pressed (see paragraph 0015).

However, the resistance value of the pressure sensitive sheet 1a can change not only when actually pressed but also when, for example, the temperature in the vicinity thereof changes. There are thus cases where the effects of ambient temperature cause a drop in the accuracy of detecting the pressing force. Particularly in a structure where a pressure sensitive sensor and a touch panel are combined as in the device disclosed in Patent Document 1, for example, heat is produced by a display device (backlight) such as a liquid crystal display and a controller that handles the execution of various applications, which tends to change the ambient temperature. As a result, it has been difficult to detect an accurate pressing force.

CITATION LIST

Patent Literature

Patent Document 1: Japanese Unexamined Patent Application Publication No. H05-61592A

SUMMARY OF INVENTION

Technical Problem

Thus, it is desired that a pressure sensitive sensor capable of suppressing a drop in the accuracy of detecting a pressing force even in the case where the ambient temperature changes be obtained. In addition, it is desired that a pressure sensitive touch panel capable of suppressing a drop in the accuracy of detecting a pressing force even in the case where the ambient temperature changes be obtained.

Solution to Problem

A pressure sensitive sensor according to the present invention includes: an elastically deformable covering member covering a front surface side; a variable resistance electrode disposed on a rear surface side of the covering member, electrical resistance thereof changing in response to a change in posture; a pyroelectric material layer disposed on the same side of the covering member as the variable resistance electrode, the pyroelectric material layer covering the variable resistance electrode; and a pair of charge detection electrodes disposed on both sides of the pyroelectric material layer in a layering direction.

According to this configuration, upon an external force being applied to the covering member, the covering member elastically deforms, which in turn deforms the variable resistance electrode. The electrical resistance of the deformed variable resistance electrode changes in response to that deformation (change in posture). This enables the magnitude of a pressing force on the covering member to be determined by detecting the amount of the change in the electrical resistance.

At this time, the electrical resistance of the variable resistance electrode can change in response to a change in the ambient temperature, but the pyroelectric material layer disposed covering the variable resistance electrode self-polarizes and produces a charge in response to a change in the ambient temperature. By detecting that produced charge using the pair of charge detection electrodes on both sides of the pyroelectric material layer, a change in the electrical resistance of the variable resistance electrode based on a change in the ambient temperature can be compensated for using the detection result.

Accordingly, it is possible to detect only the amount of a change in the electrical resistance caused by the deformation of the variable resistance electrode, regardless of a change in the ambient temperature, and as a result, a drop in the accuracy of detecting the pressing force can be suppressed even in the case where the ambient temperature changes.

A touch panel according to the present invention includes: an elastically deformable panel member having an operation surface; a plurality of first electrodes disposed, on a side of the panel member opposite from the operation surface, parallel to each other in an X axis direction at predetermined intervals, the first electrodes changing in self capacitance or mutual capacitance in response to an object to be detected approaching/receding; a plurality of second electrodes disposed, on a side of the first electrodes opposite from the panel member, parallel to each other at predetermined intervals in a Y axis direction intersecting with the X axis direction, the second electrodes changing in self capacitance or mutual capacitance in response to the object to be detected approaching/receding; a variable resistance electrode disposed on the same side of the first electrodes as the second electrodes, electrical resistance thereof changing in response to a change in posture; a pyroelectric material layer disposed on a side of the second electrodes opposite from the first electrodes, the pyroelectric material covering the variable resistance electrode; and a pair of charge detection electrodes disposed on both sides of the pyroelectric material layer in a layering direction.

In the present application, "self capacitance" of the first electrodes and the second electrodes refers to electrostatic capacitances of those respective electrodes. On the other hand, "mutual capacitance" refers to an electrostatic capacitance between the first electrodes and the second electrodes.

According to this configuration, a position of a user's finger or the like that makes contact with or approaches the operation surface of the panel member (called a "touch position") can be determined in the same manner as with a conventional electrostatic capacitance-type touch panel. In other words, the touch position on the operation surface in an X-Y coordinate system can be appropriately determined on the basis of a change in the respective self capacitances of the first electrodes and the second electrodes or a change in the mutual capacitance between the first electrodes and the second electrodes. In addition, when the operation surface of the panel member is touched by a user's finger or the like, the panel member elastically deforms, which in turn deforms the variable resistance electrode. The electrical resistance of the deformed variable resistance electrode changes in response to that deformation (change in posture). This enables the magnitude of a pressing force on the covering member to be determined by detecting the amount of the change in the electrical resistance.

At this time, the electrical resistance of the variable resistance electrode can change in response to a change in the ambient temperature, but the pyroelectric material layer disposed covering the variable resistance electrode self-polarizes and produces a charge in response to a change in the ambient temperature. By detecting that produced charge using the pair of charge detection electrodes on both sides of the pyroelectric material layer, a change in the electrical resistance of the variable resistance electrode based on a change in the ambient temperature can be compensated for using the detection result. Accordingly, it is possible to detect only the amount of a change in the electrical resistance caused by the deformation of the variable resistance electrode, regardless of a change in the ambient temperature, and as a result, a drop in the accuracy of detecting the pressing force can be suppressed even in the case where the ambient temperature changes.

Preferred aspects of the touch panel according to the present invention will be described hereinafter. Note that the scope of the present invention is not intended to be limited by the preferred aspects described hereinafter.

As one aspect, it is preferable that the plurality of second electrodes be configured to double as first detection electrodes, which are one of the pair of charge detection electrodes.

According to this configuration, the second electrodes, which are necessary for the electrostatic capacitance-type touch panel, play a role of the first detection electrodes, allowing members additionally provided to a conventional touch panel to be limited to two layers, namely the pyroelectric material layer and one layer of charge detection electrodes. Accordingly, the touch panel can be made thin and costs can be suppressed as compared to a configuration in which three layers, namely the pyroelectric material layer and the pair of charge detection electrodes, are added.

As one aspect, it is preferable that second detection electrodes, which are the other of the pair of charge detection electrodes, be configured as a plurality of electrodes disposed parallel to each other at predetermined intervals, and that the variable resistance electrode be, when viewed in the layering direction, formed in a zig-zag shape so as to weave between the plurality of second detection electrodes and be disposed coplanarly with the second detection electrodes.

According to this configuration, because the variable resistance electrode is formed as a single continuous electrode, the amount of a change in the electrical resistance can be detected in a comparatively simple configuration. In this case, the variable resistance electrode, which has a zig-zag shape when viewed in the layering direction, is disposed coplanarly with the second detection electrodes while weaving between the plurality of second detection electrodes, and thus the variable resistance electrode and the second detection electrodes can be collectively disposed on a single layer. Accordingly, the touch panel can be made even thinner than a configuration in which three layers, namely the pyroelectric material layer and the pair of charge detection electrodes, are added. In addition, in this configuration, the variable resistance electrode is separated from the first electrodes and the second electrodes that serve as variable electrostatic capacitance electrodes, and thus a drop in the accuracy of detecting the pressing force caused by the effects of static electricity can be effectively suppressed.

As one aspect, it is preferable that the variable resistance electrode be, when viewed in the layering direction, formed in a zig-zag shape so as to weave between the plurality of second electrodes and be disposed coplanarly with the second electrodes.

According to this configuration, because the variable resistance electrode is formed as a single continuous electrode, the amount of a change in the electrical resistance can be detected in a comparatively simple configuration. In this case, the variable resistance electrode, which has a zig-zag shape when viewed in the layering direction, is disposed coplanarly with the second electrodes while weaving between the plurality of second electrodes, and thus the variable resistance electrode and the second electrodes can be collectively disposed on a single layer. Accordingly, the touch panel can be made even thinner than a configuration in which three layers, namely the pyroelectric material layer and the pair of charge detection electrodes, are added.

As one aspect, it is preferable that the touch panel further include: a resistance detection unit that detects electrical resistance of the variable resistance electrode; a charge detection unit that detects the amount of a charge produced by self-polarization of the pyroelectric material layer; and an input determination unit that, on the basis of a detection result from the resistance detection unit and a detection result from the charge detection unit, corrects the detection result from the resistance detection unit using the detection result from the charge detection unit, and determines a pressing force on the operation surface.

According to this configuration, a pressing force on the operation surface can be determined with a high level of accuracy regardless of changes in the ambient temperature.

DESCRIPTION OF EMBODIMENTS

A touch panel according to the present invention will be described with reference to the drawings. A touch panel 5 according to the present embodiment is provided in an electronic device 1 such as a cellular phone or a mobile gaming device, and functions as a touch input device. For the present embodiment, a description will be given of an example in which the touch panel 5 is provided in a multifunction cellular phone (a smartphone) serving as a type of the electronic device 1. Note that a side on which an input surface (an operation surface 10a, which will be described later) of the touch panel 5 serving as the touch input device is located will be called "front surface side" in the following descriptions. This "front surface side" is a side that faces a user who is operating the electronic device 1. Conversely, a back side as viewed from the user who is operating the electronic device 1 will be called a "rear surface side".

Figure 1:
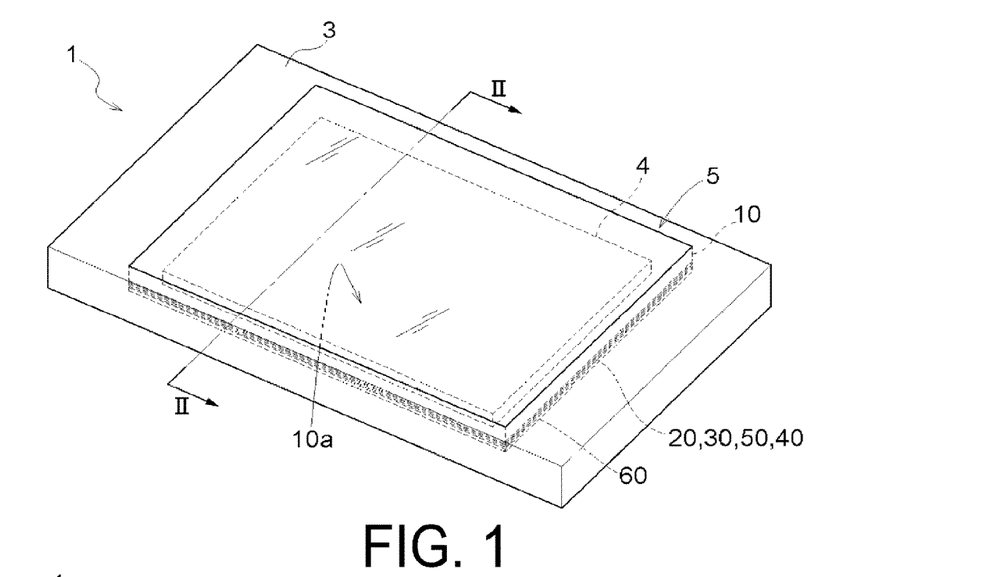
FIG. 1 is a perspective view of an electronic device provided with a pressure sensitive touch panel.
Figure 2:
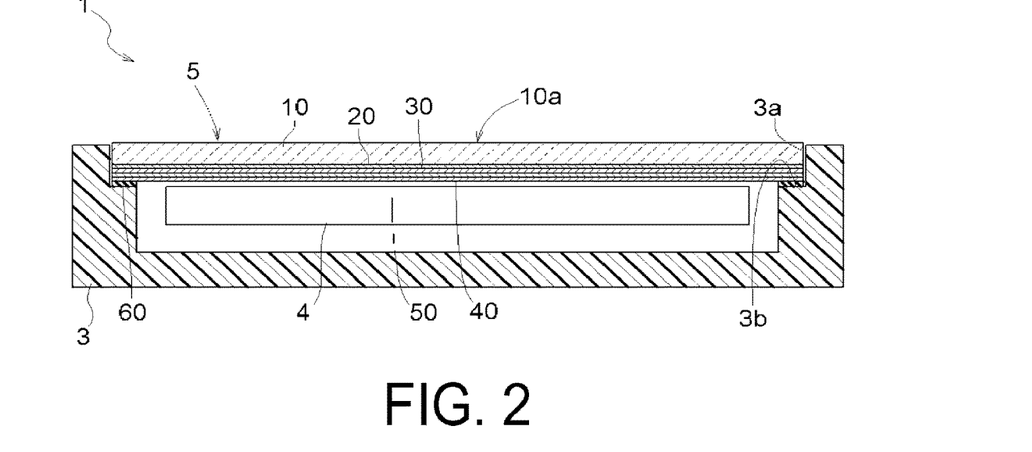
FIG. 2 is a cross-sectional view taken along a line II-II in FIG. 1.

As illustrated in FIGS. 1 and 2, the electronic device 1 includes a substantially parallelepiped housing 3, a display device 4 installed within the housing 3, and the touch panel 5 disposed on the front surface side of the display device 4. The housing 3 is formed of a synthetic resin. The housing 3 includes a recessed portion 3a that is open toward the front surface side in a rectangular shape. The recessed portion 3a is formed so as to have a step, and this step portion functions as a support portion 3b that supports the touch panel 5 from the rear surface side of the touch panel 5. The support portion 3b is formed in a rectangular frame shape (picture frame shape) that corresponds to the shape of the recessed portion 3a. The display device 4 is housed in a region (a first housing recessed portion) located further toward the rear surface side than the support portion 3b (the step portion), and the touch panel 5 is housed within a region (a second housing recessed portion) on the front surface side while being supported by the support portion 3b. The display device 4 is constituted of a liquid-crystal display panel, or an organic electroluminescence (EL) display panel, for example.

The shape and dimensions of the recessed portion 3a (the first housing recessed portion and the second housing recessed portion) can be set as appropriate in accordance with the shape and dimensions of the display device 4, the touch panel 5, and the like. As one example, in the present embodiment, both the display device 4 and the touch panel 5 have substantially parallelepiped shapes, and when viewed in plan view (that is, from the front surface side), the touch panel 5 has greater dimensions than the display device 4. The recessed portion 3a is formed so that a side surface of the first housing recessed portion and a side surface of the display device 4 face each other with a predetermined gap therebetween and a side surface of the second housing recessed portion and a side surface of the touch panel 5 face each other with almost no gap therebetween; and so that a front surface of the display device 4 and a front surface of the support portion 3b are at substantially the same height and a front surface of the housing 3 and a front surface of the touch panel 5 are at substantially the same height.

In the present embodiment, the touch panel 5 is configured so that when a user's finger, a stylus manipulated by the user, or the like approaches or makes contact with the operation surface 10a, a position corresponding to the user's finger or the like (called a "touch position") is detected. In addition to the touch position (a position on the operation surface 10a that has been pressed), the touch panel 5 is also configured to simultaneously detect the magnitude of a pressing force on the operation surface 10a when the user actually touches the operation surface 10a with his or her finger or the like. In other words, the touch panel 5 according to the present embodiment is configured as a pressure sensitive touch panel.

Figure 3:
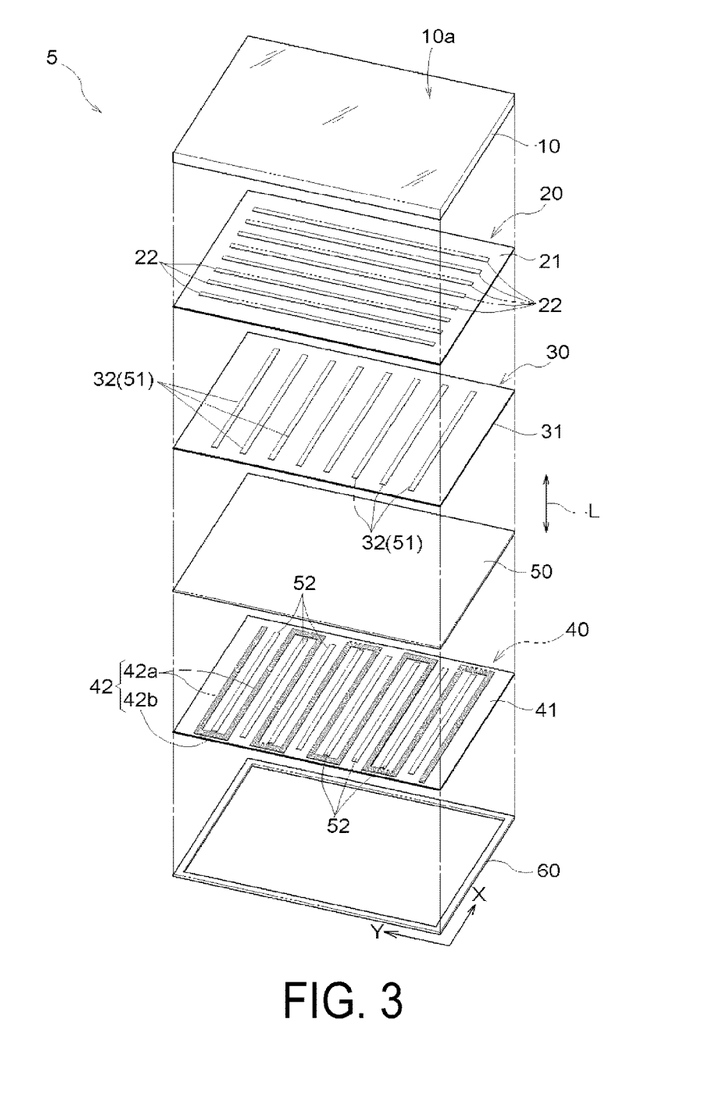
FIG. 3 is an exploded perspective view of the touch panel.

As illustrated in FIG. 3, the touch panel 5 includes a panel member 10, a first electrode forming member 20, a second electrode forming member 30, a third electrode forming member 40, a pyroelectric material layer 50, and a support member 60. The panel member 10, the first electrode forming member 20, the second electrode forming member 30, the pyroelectric material layer 50, the third electrode forming member 40, and the support member 60 are layered in that order from the front surface side to the rear surface side. The third electrode forming member 40 is disposed on the support portion 3b of the housing 3 with the support member 60 interposed therebetween, the pyroelectric material layer 50 is disposed on the third electrode forming member 40, the second electrode forming member 30 is disposed on the pyroelectric material layer 50, the first electrode forming member 20 is disposed on the second electrode forming member 30, and the panel member 10 is disposed on the first electrode forming member 20 (see FIG. 2 as well). These elements are affixed to each other with a pressure sensitive adhesive (PSA), for example.

In addition, in the present embodiment, the panel member 10, the first electrode forming member 20, the second electrode forming member 30, the third electrode forming member 40, and the pyroelectric material layer 50 are formed in a rectangular shape when viewed in plan view (when viewed from a layering direction L), and are stacked with each other. A direction along one of the four sides of the rectangular shape is defined as an "X axis direction" in the present embodiment, and a direction along another of the sides that intersects with (is orthogonal to, in this example) the stated one side is defined as a "Y axis direction" in the present embodiment. In the present embodiment, an X-Y coordinate system (X-Y orthogonal coordinate system) is established on the basis of the mutually-orthogonal X axis direction and Y axis direction. Note that the X-Y coordinate system may be established on the basis of an X axis direction and a Y axis direction that intersect at a non-right angle.

The panel member 10 is a plate-shaped member disposed furthest on the front surface side of the touch panel 5. The panel member 10 has the operation surface 10a on its front surface side surface. The operation surface 10a is a surface to be touched (manipulated) by the user's finger or the like when the user inputs predetermined operations to the electronic device 1. In the present embodiment, the panel member 10 functions as a protective panel that protects the first electrode forming member 20, the second electrode forming member 30, and the like. It is preferable that the panel member 10 be transparent, scratch-resistant, fouling resistant, and the like. The panel member 10 can be formed of a glass plate composed of soda glass, tempered glass, or the like, for example, and is formed of a thin glass plate in the present embodiment. Alternatively, the panel member 10 may be formed of a resin material such as polymethyl methacrylate or polycarbonate, an organic-inorganic hybrid material, or the like. Using a material having superior strength allows the panel member 10 to be thinner. Although the panel member 10 is originally capable of elastic deformation, making the panel member 10 thinner is advantageous in that the panel member 10 can elastically deform with ease.

The first electrode forming member 20 includes a first substrate 21 and a plurality of (eight, in this example) first electrodes 22 formed on the first substrate 21. It is preferable that the first substrate 21 be formed of a material having superior transparency, flexibility, insulative properties, and the like. A general-purpose resin such as polyethylene terephthalate or an acrylic resin, a general-purpose engineering resin such as a polyacetal resin or a polycarbonate resin, a super engineering resin such as a polysulfone resin or a polyphenylene sulfide resin, and the like can be given as examples of materials that meet such requirements. In the present embodiment, the first substrate 21 is formed of a polyethylene terephthalate film.

The plurality of first electrodes 22 are disposed parallel to each other in the X axis direction at predetermined intervals. In the present embodiment, the first electrodes 22 are formed in a stripe shape (lines having a constant width). However, the first electrodes 22 may be formed in a wave shape or zig-zag shape, for example. Regardless of shape, each of the first electrodes 22 is formed so as to extend in the Y axis direction overall. The first electrodes 22 are formed so that an electrostatic capacitance thereof changes in response to an object to be detected (a conductor such as the user's finger) approaching/receding. Note that "electrostatic capacitance" is a concept that includes both self capacitance and mutual capacitance. In other words, the first electrodes 22 are formed so that self capacitance or mutual capacitance with second electrodes 32 changes in response to the object to be detected approaching/receding. It is preferable that the first electrodes 22 be formed of a material having superior electrical conductivity and transparency. A metal oxide such as tin oxide, indium oxide, antimony oxide, zinc oxide, cadmium oxide, or indium tin oxide (ITO), a metal mesh formed of a metal such as copper, or aluminum, silver nanowires, carbon nanotubes, an electrically conductive polymer, and the like can be given as examples of materials that meet such requirements. The first electrodes 22 are transparent electrically-conductive films formed of such a material. In the present embodiment, the first electrodes 22 are formed of an ITO thin film.

For example, forming the transparent electrically-conductive film across the entire surface of the first substrate 21 and then etching away the unnecessary parts of the film can be given as an example of a method for forming the first electrodes 22. The transparent electrically-conductive film can be formed across the entire surface through vacuum deposition, sputtering, ion plating, chemical vapor deposition (CVD), roll coating, or the like, for example. The etching can be carried out by forming a resist film through photolithography, screen printing, or the like on the areas that are to remain as the electrodes, and then immersing the substrate in an etchant such as hydrochloric acid. The etching can also be carried out by forming a resist film, ejecting an etchant to remove the transparent electrically-conductive film from the areas where the resist film is not formed, and then removing the resist film by immersing the substrate in a solution to cause the resist film to swell or dissolve. The etching can also be carried out by a laser.

The second electrode forming member 30 includes a second substrate 31 and a plurality of (eight, in this example) second electrodes 32 formed on the second substrate 31. It is preferable that the second substrate 31 also be formed of a material having superior transparency, flexibility, insulative properties, and the like. The same materials as those for forming the first substrate 21 can be considered as materials for forming the second substrate 31.

The plurality of second electrodes 32 are disposed facing the plurality of first electrodes 22 with a predetermined gap therebetween in the layering direction L (a thickness direction). In addition, the plurality of second electrodes 32 are disposed parallel to each other in the Y axis direction at predetermined intervals. In the present embodiment, the second electrodes 32 are formed in a stripe shape (lines having a constant width). However, the second electrodes 32 may be formed in a wave shape or zig-zag shape, for example. Regardless of shape, each of the second electrodes 32 is formed so as to extend in the X axis direction overall. As a result, the first electrodes 22 and the second electrodes 32 are disposed so as to intersect with (be orthogonal to, in this example) each other when viewed in plan view. Like the first electrodes 22, the second electrodes 32 are formed so that electrostatic capacitance thereof changes in response to the object to be detected approaching/receding. The second electrodes 32 are formed so that self capacitance or mutual capacitance with the first electrodes 22 changes in response to the object to be detected approaching/receding. It is preferable that the second electrodes 32 be formed of a material having superior electrical conductivity and transparency. The same materials and formation methods as those for forming the first electrodes 22 can be considered for forming the second electrodes 32.

In the present embodiment, the plurality of first electrodes 22 are disposed on the first substrate 21 so as to be separated without connecting to each other like an island. Likewise, the plurality of second electrodes 32 are disposed on the second substrate 31 so as to be separated without connecting to each other like an island. The plurality of first electrodes 22 and the plurality of second electrodes 32 are disposed so as to form a lattice shape overall, when viewed in plan view. The plurality of first electrodes 22 and the plurality of second electrodes 32 constitute a general electrostatic capacitance-type touch panel. Note that the first substrate 21 is present between the first electrodes 22 and the second electrodes 32, and the first electrodes 22 and second electrodes 32 are disposed with the first substrate 21 therebetween in the layering direction L (the thickness direction). In the present embodiment, no air gap exists between the first electrodes 22 and the second electrodes 32, enabling optical characteristics to be improved. Specifically, this configuration suppresses reflection of light to minimize a drop in transmittance.

The third electrode forming member 40 includes a third substrate 41 and a third electrode 42 formed on the third substrate 41. It is preferable that the third substrate 41 also be formed of a material having superior transparency, flexibility, insulative properties, and the like. The same materials as those for forming the first substrate 21 and the second substrate 31 can be considered as materials for forming the third substrate 41.

As illustrated in FIG. 3, the third electrode 42 is in the present embodiment formed as a single electrode that continues across the entirety of the third substrate 41 in a predetermined pattern. The third electrode 42 is formed in a zig-zag shape when viewed in plan view (that is, in the layering direction L). The third electrode 42 includes parallel extending portions 42a disposed parallel to each other in the Y axis direction at predetermined intervals while extending in the X axis direction. The third electrode 42 further includes connecting portions 42b that connect parallel extending portions 42a adjacent to each other in the Y axis direction, alternately at one end side and the other end side thereof in the X axis direction. The third electrode 42 is formed so that the width thereof in a direction orthogonal to the extension direction of the third electrode 42 is the same throughout the extension direction. The third electrode 42 is also formed at a uniform thickness, and a cross-sectional area thereof is the same throughout the extension direction.

The third electrode 42 is formed of a material whose electrical resistance changes in response to a change in posture of the material. It is preferable that the third electrode 42 be formed of a material having superior electrical conductivity and transparency. A metal oxide such as tin oxide, indium oxide, antimony oxide, zinc oxide, cadmium oxide, or ITO, a metal mesh formed of a metal such as copper, or aluminum, silver nanowires, carbon nanotubes, an electrically conductive polymer, and the like can be given as examples of materials that meet such requirements. The third electrode 42 is a transparent electrically-conductive film formed of such a material. In the present embodiment, the third electrode 42 is formed of an ITO thin film. The same formation methods as those for forming the first electrodes 22 and the second electrodes 32 can be considered for forming the third electrode 42. In the present embodiment, the third electrode 42 corresponds to a "variable resistance electrode" according to the present invention.

The pyroelectric material layer 50 is disposed, on the opposite side of the second electrodes 32 from the side where the first electrodes 22 are disposed, to cover the third electrode 42. The pyroelectric material layer 50 is formed having substantially the same size as the second electrode forming member 30 and the third electrode forming member 40 when viewed in plan view, and is disposed covering the entire third electrode 42 from the front surface side. The pyroelectric material layer 50 is a functional layer formed of a pyroelectric material. Here, a "pyroelectric material" is a material having a pyroelectric effect (that is, a phenomenon where a state of polarization (a state of a surface charge) changes in response to a change in temperature). The pyroelectric material layer 50 self-polarizes, for example, in response to a change in the ambient temperature around the electronic device 1, a change in a local temperature near the touch position, or the like. The pyroelectric material layer 50 may be formed of an inorganic pyroelectric material, or may be formed of an organic pyroelectric material (a high-polymer pyroelectric material).

Tourmaline, lithium sulfate hydrate, potassium sodium tartrate, calcium titanate, lead-zirconium-titanium (PZT), barium-strontium-titanium (BST), strontium-bismuth-tantalum (SBT), bismuth-lanthanum-tantalum (BLT), and the like can be given as examples of inorganic pyroelectric materials. Polyvinylidene fluoride (PVDF) and copolymers thereof (polyvinylidene fluoride/trifluoroethylene copolymer and polyvinylidene fluoride/tetrafluoroethylene copolymer, for example) can be given as examples of organic pyroelectric materials. It is preferable that the pyroelectric material layer 50 be formed of a material having superior transparency and flexibility, and in the present embodiment, the pyroelectric material layer 50 is formed of polyvinylidene fluoride, which is an organic pyroelectric material. The pyroelectric material layer 50 can be formed through vacuum deposition, sputtering, ion plating, CVD, roll coating, or the like, for example.

A pair of charge detection electrodes (first detection electrodes 51 and second detection electrodes 52) are disposed on either side of the pyroelectric material layer 50 in the layering direction L. The charge detection electrodes 51 and 52 are electrodes for detecting a charge produced at the surface of the pyroelectric material layer 50 by self-polarization of the pyroelectric material layer 50 in response to a change in temperature. The charge detection electrodes 51 and 52 may be configured as dedicated electrodes used only to detect a surface charge of the pyroelectric material layer 50. Alternatively, electrodes used for another purpose may serve as the charge detection electrodes 51 and 52 as long as the function of detecting the surface charge can be sufficiently achieved. As illustrated in FIG. 3, in the present embodiment, the plurality of second electrodes 32 serving as variable electrostatic capacitance electrodes are configured to double as the first detection electrodes 51 of the pair of charge detection electrodes 51 and 52. Note that the second detection electrodes 52 of the pair of charge detection electrodes 51 and 52 are dedicated electrodes for charge detection.

The first detection electrodes 51 that the second electrodes 32 are configured to double as are disposed parallel to each other in the Y axis direction at predetermined intervals while extending in the X axis direction. In the present embodiment, the second detection electrodes 52 are also disposed parallel to each other in the Y axis direction at predetermined intervals while extending in the X axis direction. The plurality of (eight, in this example) first detection electrodes 51 and the plurality of (eight, in this example) second detection electrodes 52 are disposed so as to overlap when viewed in plan view.

The plurality of second detection electrodes 52 may be formed on a dedicated substrate, but may instead be formed on a substrate provided in the touch panel 5 that is used for another purpose, as long as the function of the electrodes can be sufficiently achieved. As illustrated in FIG. 3, in the present embodiment, the plurality of second detection electrodes 52 are formed on the third substrate 41 on which the third electrode 42 is formed. To rephrase, the third substrate 41 on which the third electrode 42 is disposed is configured to double as the substrate on which the second detection electrodes 52 are disposed. The second detection electrodes 52 and the third electrode 42 are disposed coplanarly with each other on the third substrate 41.

As described above, the third electrode 42 includes the plurality of parallel extending portions 42a and the plurality of connecting portions 42b, and is formed in a zig-zag shape when viewed in plan view. Each of the second detection electrodes 52 is disposed between the parallel extending portions 42a of the third electrode 42 that are adjacent to each other in the Y axis direction so as to be parallel to the parallel extending portions 42a. In this manner, the third electrode 42 formed in a zig-zag shape is disposed so as to weave between the plurality of second detection electrodes 52 when viewed in plan view.

The second detection electrodes 52 are formed of an electrically conductive material. It is preferable that the second detection electrodes 52 be formed of a material having superior electrical conductivity, transparency, and flexibility. A metal oxide such as tin oxide, indium oxide, antimony oxide, zinc oxide, cadmium oxide, or ITO, a metal mesh formed of a metal such as copper, or aluminum, silver nanowires, carbon nanotubes, an electrically conductive polymer, and the like can be given as examples of materials that meet such requirements. The second detection electrodes 52 are a transparent electrically-conductive film formed of such a material. In the present embodiment, the second detection electrodes 52 are formed of an ITO thin film, like the second electrodes 32 that double as the first detection electrodes 51. The same formation methods as those for forming the first electrodes 22 and the second electrodes 32 can be considered for forming the second detection electrodes 52.

The support member 60 supports the panel member 10 from the rear surface side of the panel member 10. The support member 60 is formed in a rectangular frame shape when viewed in plan view, so as to correspond to the shape of the support portion 3b of the housing 3. The support member 60 is provided so as to support peripheral edge portions (the vicinity of each side) of the panel member 10, the electrode forming members 20, 30, and 40, and the pyroelectric material layer 50, which are formed in a rectangular shape. It is preferable that the support member 60 be formed of a material that is elastic or flexible, but that also holds its shape enough to appropriately support the panel member 10 and the like. Urethane foam, acrylic foam, silicon rubber, a sponge, a gel, and the like can be given as examples of materials that meet these requirements. A double-sided tape having an adhesive layer on both sides may be used as well.

The support member 60 provided in this manner can simply support the panel member 10. This support structure allows only part of the panel member 10 (specifically, the vicinity of part to be supported by the support member 60) to locally deform to prevent the third electrode 42 from undergoing compression deformation. As a result, deformation (change in posture) in the third electrode 42 can be substantially limited to expansion deformation, which makes it possible to improve the accuracy of detecting a pressing force.

Figure 4:
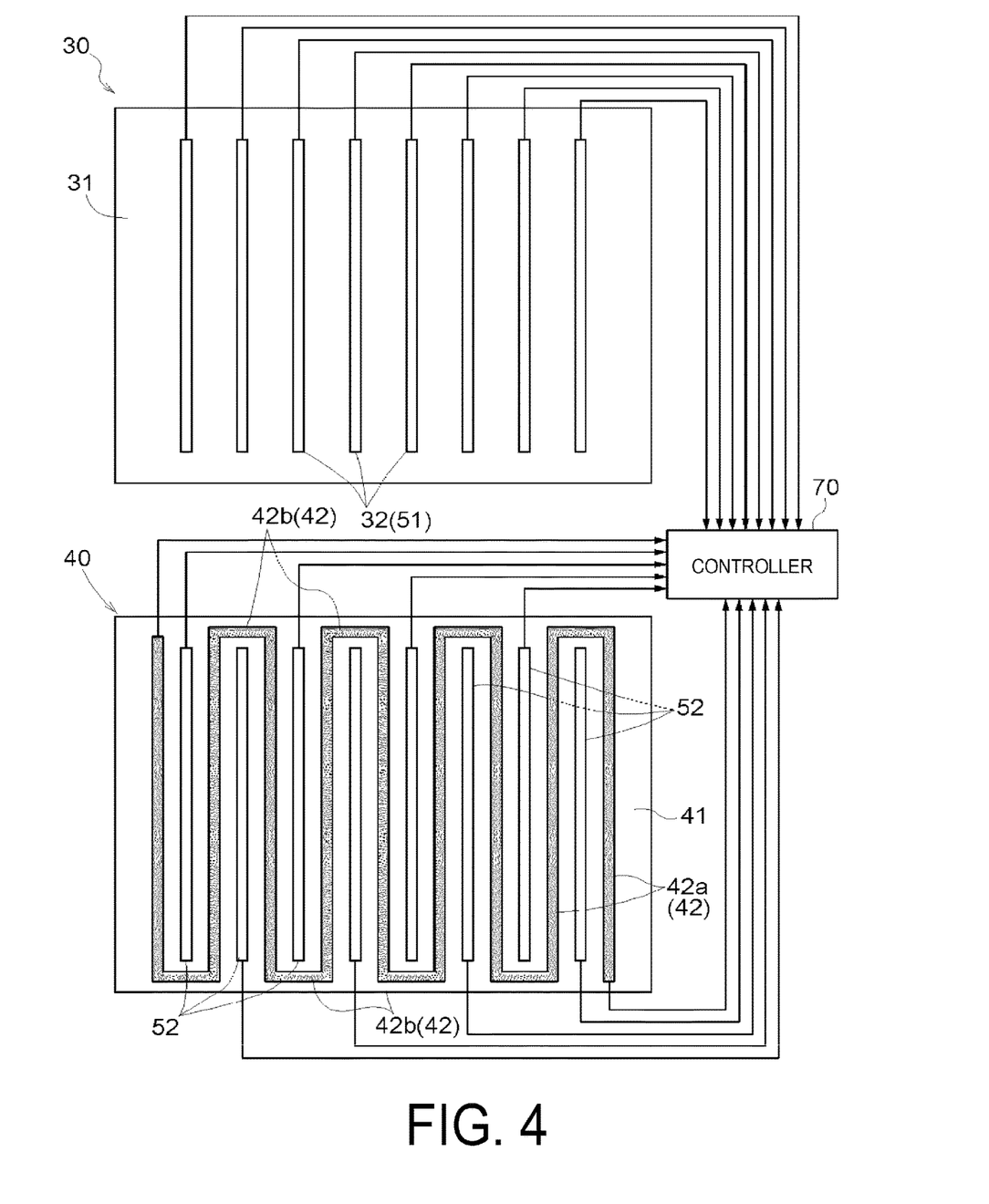
FIG. 4 is a schematic diagram illustrating a relationship of connections of a third electrode and a charge detection electrode to a controller.

As illustrated in FIG. 4, the plurality of first detection electrodes 51 (the second electrodes 32) and the plurality of second detection electrodes 52 are connected to a controller 70 via routing wires. Both ends of the single zig-zag shaped third electrode 42 are also connected to the controller 70 via routing wires. Although not illustrated in the drawings, each of the plurality of first electrodes 22 is also connected to the controller 70 via routing wires. Note that the routing wires are formed of a metal such as gold, silver, copper, or nickel, or an electrically conductive paste such as carbon. A switch (not illustrated) constituted of a switching element, for example, is provided as appropriate in each of the routing wires, and each of the electrodes can be selectively connected to the controller 70 in a predetermined period.

Figure 5:
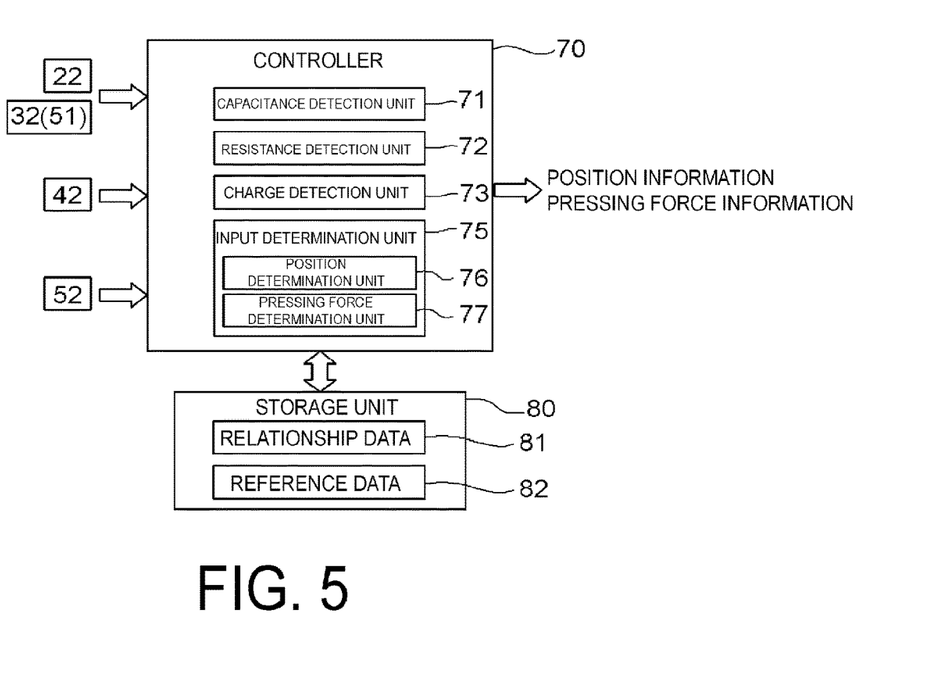
FIG. 5 is a block diagram illustrating the configuration of the controller.

The controller 70 includes a computational processing device such as a CPU as the core member of the controller 70, and is constituted of hardware, software (program), or the combination thereof to be a functional unit for carrying out various types of processes on inputted data. The controller 70 may be provided as a dedicated unit for the touch panel 5, or may be constituted of some of the functions of the computational processing device provided in the electronic device 1, for example. As illustrated in FIG. 5, the controller 70 includes a capacitance detection unit 71, a resistance detection unit 72, a charge detection unit 73, and an input determination unit 75. The input determination unit 75 includes a position determination unit 76 and a pressing force determination unit 77. In addition, the controller 70 is connected to a storage unit 80 in a manner so that the controller 70 and the storage unit 80 can communicate information with each other. The storage unit 80 is constituted of a memory such as a random access memory (RAM), an electrically erasable programmable read only memory (EEPROM), a flash memory, or the like. Relationship data 81 and reference data 82 are stored in the storage unit 80.

In the present embodiment, the capacitance detection unit 71 detects the respective electrostatic capacitances (self capacitances) of the plurality of first electrodes 22 and the plurality of second electrodes 32. To that end, the capacitance detection unit 71 is constituted of components including a known electrostatic capacitance detection circuit. The capacitance detection unit 71 detects the electrostatic capacitance of each of the first electrodes 22 in sequence in a predetermined period. The capacitance detection unit 71 also detects the electrostatic capacitance of each of the second electrodes 32 in sequence in the predetermined period. The first electrodes 22 and the second electrodes 32 may be scanned synchronously or alternately. Note that a mutual-type detection method may be employed. In this case, the capacitance detection unit 71 detects an electrostatic capacitance between each of the first electrodes 22 and the corresponding second electrode 32 (a mutual capacitance). Using a mutual method makes it possible to handle multi-touch gestures. Information of values detected by the capacitance detection unit 71 is sent to the input determination unit 75 (the position determination unit 76).

The resistance detection unit 72 detects an electrical resistance of the third electrode 42. To that end, the resistance detection unit 72 is constituted of components including a resistance detection circuit. The resistance detection circuit is constituted of a known bridge circuit (a Wheatstone bridge circuit). The resistance detection unit 72 detects the electrical resistance (resistance value) of the third electrode 42 on the basis of a voltage across the third electrode 42 (a bridge voltage). From a different standpoint, a resistance value based on the posture of the third electrode 42 is detected by the resistance detection unit 72 as a "voltage signal" across the third electrode 42. In this sense, the resistance detection unit 72 detects an output voltage from the bridge circuit and a resistance value based on that output voltage. Information of values detected by the resistance detection unit 72 is sent to the input determination unit 75 (the pressing force determination unit 77).

The charge detection unit 73 detects the amount of a charge produced by self-polarization of the pyroelectric material layer 50. To that end, the charge detection unit 73 is constituted of components including a charge detection circuit. This charge detection circuit is constituted of a known charge amplifier. The charge detection unit 73 detects the amount of a charge produced by self-polarization of the pyroelectric material layer 50 caused by a change in ambient temperature and the like and collected by the pair of charge detection electrodes 51 and 52. The total amount of the collected charge (an integrated value) is detected by the charge detection unit 73 as a "voltage signal". Information of values detected by the charge detection unit 73 is sent to the input determination unit 75 (the pressing force determination unit 77).

The position determination unit 76 included in the input determination unit 75 determines a position on the operation surface 10$a$ in the X-Y coordinate system that has been pressed on the basis of a detection result from the capacitance detection unit 71. In the present embodiment, the position determination unit 76 identifies a first electrode 22, among the plurality of first electrodes 22, that exhibits the largest change in electrostatic capacitance when the operation surface 10$a$ is touched (the maximum change when multiple positions are touched) to determine an X coordinate of the touch position, on the basis of the electrostatic capacitance when the user's finger or the like is sufficiently distanced. Furthermore, the position determination unit 76 identifies a second electrode 32, among the plurality of second electrodes 32, that exhibits the largest (or maximum) change in electrostatic capacitance when the operation surface 10$a$ is touched to determine a Y coordinate of the touch position, on the basis of the electrostatic capacitance when the user's finger or the like is sufficiently distanced. In the case of the mutual method, the position determination unit 76 determines the X and Y coordinates of the touch position on the basis of the amount of a change in mutual capacitance between one of first electrodes 22 and the corresponding second electrode 32. It is also preferable that the position determination unit 76 be configured to carry out an interpolation operation using the electrostatic capacitance actually detected by the capacitance detection unit 71 and identify the touch position in detail on the basis of a result of that operation.

Figure 6:
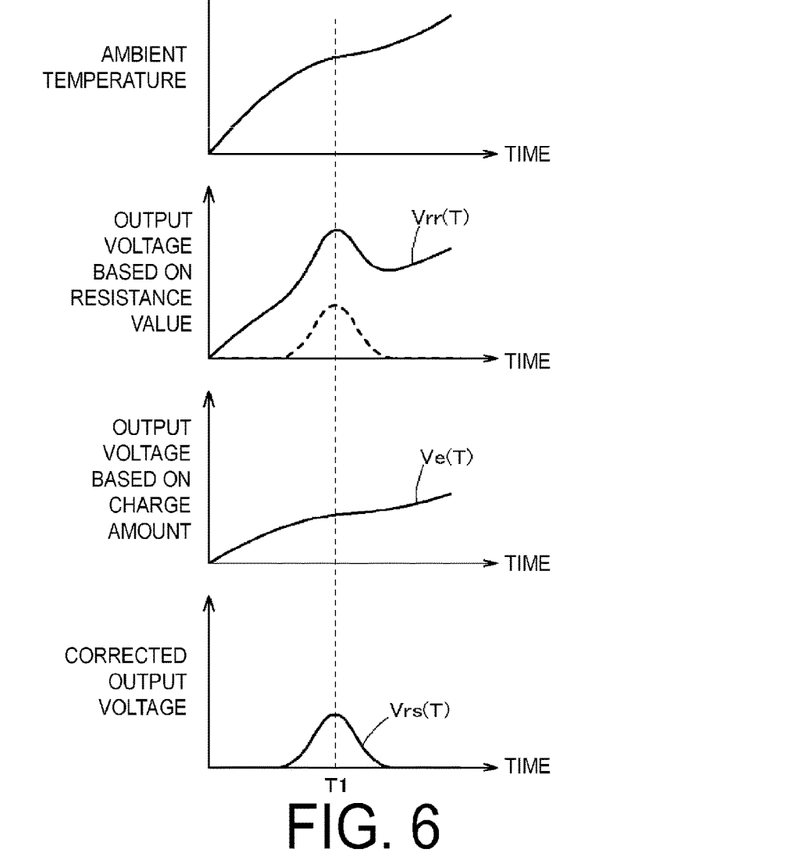
FIG. 6 is a diagram schematically illustrating a principle of detecting a pressing force.

The pressing force determination unit 77 included in the input determination unit 75 determines a pressing force on the operation surface 10a on the basis of a detection result from the resistance detection unit 72 and a detection result from the charge detection unit 73. The input determination unit 75 does not simply determine the pressing force on the operation surface 10a on the basis of the detection result from the resistance detection unit 72 alone, but rather determines the pressing force on the operation surface 10a by correcting the detection result from the resistance detection unit 72 using the detection result from the charge detection unit 73. Hereinafter, the correction of the detection result from the resistance detection unit 72 using the detection result from the charge detection unit 73 will be described with reference to FIG. 6. FIG. 6 illustrates, in order from the top, a change over time in ambient temperature, a detection result from the resistance detection unit 72 (that is, a change over time in the output voltage based on the resistance value), a detection result from the charge detection unit 73 (that is, a change over time in the output voltage based on the charge amount), and corrected data (a change over time in a corrected output voltage).

Assuming that a single touch operation has been made on the operation surface 10a at a time T1 in a state where the ambient temperature does not fluctuate at all, the output voltage changes only near the time T1, and no fluctuation in the output voltage is detected in other time spans, as indicated by the dashed line in the second graph from the top in FIG. 6. However, when an actual usage of the electronic device 1 is considered, for example, heat is produced by a display device (backlight) such as a liquid crystal display and a controller 70 that handles the execution of various applications, which tends to change the ambient temperature around the third electrode 42. For example, as indicated by the uppermost part of FIG. 6, the ambient temperature may gradually rise from the point in time when the electronic device 1 starts being used. A temperature in the vicinity of the touch position may also locally rise due to body heat or the like in the case where the user's touch positions are concentrated on a specific location or range.

At this time, the output voltage based on the resistance value of the third electrode 42, detected by the resistance detection unit 72 in the case where a touch operation is made at the time T1, changes over time as indicated by the solid line in the second graph from the top in FIG. 6. In other words, while undergoing zero point drift as the ambient temperature rises, the output voltage based on the resistance value of the third electrode 42 changes over time such that a voltage value based on the pressing force of the touch operation made on the operation surface 10a is temporarily added to the output voltage at the time T1. Accordingly, the pressing force cannot be detected accurately if the pressing force on the operation surface 10a is determined on the basis of the detection result from the resistance detection unit 72 alone. For example, in the example illustrated in FIG. 6, the pressing force calculated by the pressing force determination unit 77 may have a greater value than the pressing force actually applied. Note that the state of change in the zero point drift generally matches the state of change in the ambient temperature.

Meanwhile, the output voltage based on the charge amount produced by the self-polarization of the pyroelectric material layer 50 caused by a change in the ambient temperature or the like, which is detected by the charge detection unit 73, also changes over time so as to generally match the state of change in the ambient temperature, as indicated by the second graph from the bottom in FIG. 6. A constant correlation relationship exists between the zero point drift of the output voltage based on the resistance value of the third electrode 42 and the change in the output voltage based on the charge amount produced by the self-polarization of the pyroelectric material layer 50, which are based on a change in the ambient temperature. In other words, it can be said that the two are generally in a proportional relationship. For example, when the former is represented by Vr0(T) as a function of time T and the latter is represented by Ve(T) also as a function of the time T, and k represents a predetermined proportionality constant, a relationship of $Vr0(T) \approx k \cdot Ve(T)$ holds true.

On the basis of this relational expression, the pressing force determination unit 77 uses the change (Ve(T)) in the output voltage based on the charge amount produced by the self-polarization of the pyroelectric material layer 50 to compensate for the zero point drift of the output voltage based on the resistance value of the third electrode 42. In other words, the pressing force determination unit 77 subtracts a value proportional to the change in the output voltage based on the charge amount (Ve(T)) from the output voltage based on the resistance value of the third electrode 42 actually detected by the resistance detection unit 72 (this is represented by Vrr(T) as a function of the time T) and calculates a substantial output voltage produced by the touch operation (this is represented by Vrs(T) as a function of the time T) as $Vrs(T) = Vrr(T) - Vr0(T) \approx Vrr(T) - k \cdot Ve(T)$.

The output voltage Vrs(T) calculated in this manner becomes as indicated in the lowermost part of FIG. 6, and is the same as the change over time in the output voltage in a state where the ambient temperature does not fluctuate at all (see the dashed line in the second graph from the top). In other words, correcting the detection result from the resistance detection unit 72 using the detection result from the charge detection unit 73 makes it possible to eliminate the amount of a fluctuation in the output voltage caused by a change in the ambient temperature and detect only the substantial amount of a change in the output voltage produced by the touch operation. This in turn makes it possible to detect only the amount of a change in the resistance value based on the amount of the substantial change in the output voltage produced by the touch operation.

Figure 7:
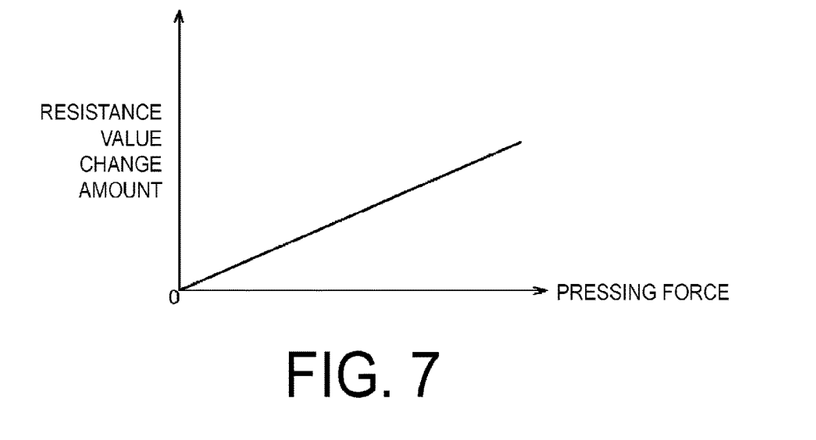
FIG. 7 is a relationship map illustrating a relationship between a resistance value change amount and a pressing force.

A relationship between the pressing force on the operation surface 10a and the resistance value change amount from an unpressed state is stored in advance in the storage unit 80 as the relationship data 81. The relationship data 81 may be in the form of the relationship map illustrated in FIG. 7, for example, or may be in the form of a predetermined relational expression. Furthermore, the reference data 82, which is obtained by measuring the resistance value of the third electrode 42 in the unpressed state (a reference resistance value) in advance, is stored in the storage unit 80. The pressing force determination unit 77 determines a pressing force based on a substantial resistance value change amount, on the basis of the relationship data 81 and a substantial resistance value change (a difference between a substantial resistance value and the reference resistance value). The compensation for the amount of a fluctuation in the output voltage caused by a change in the ambient temperature using the detection result from the charge detection unit 73 minimize a drop in the accuracy of detecting the pressing force even in the case where the ambient temperature or the like has changed.

Furthermore, the pyroelectric material layer 50 and the pair of charge detection electrodes 51 and 52 are disposed so as to follow the entirety of the third electrode 42, and thus the compensation calculation can more accurately reflect the ambient temperature, the local temperature at the touch position, and the like. A drop in the accuracy of detecting the pressing force can therefore be effectively suppressed.

In addition, in the present embodiment, a one glass solution (OGS) technique may be employed to form the three electrodes 22, 32, and 42 on the panel member 10 that is formed of a thin glass plate, and in this case, a slim-type touch panel 5 is realized. The touch panel 5 itself is made thin, and thus the overall device is kept from becoming large to a certain extent even in the case where the pyroelectric material layer 50 and the pair of charge detection electrodes 51 and 52 are additionally provided for the purpose of temperature change compensation.

In this case, in the present embodiment, the plurality of second electrodes 32 are configured to double as the first detection electrodes 51 of the pair of charge detection electrodes 51 and 52. The second electrodes 32, which are necessary for the electrostatic capacitance-type touch panel 5, play a role of the first detection electrodes 51 in this manner, allowing members additionally provided to a conventional touch panel 5 to be limited to two layers, namely the pyroelectric material layer 50 and one layer of charge detection electrodes. Accordingly, the touch panel 5 can be made thin and costs can be suppressed as compared to a configuration in which three layers, namely the pyroelectric material layer 50 and the pair of charge detection electrodes 51 and 52, are added.

Furthermore, in the present embodiment, the second detection electrodes 52 of the pair of charge detection electrodes 51 and 52 are constituted of a plurality of electrodes disposed parallel to each other at predetermined intervals; when viewed in plan view, the third electrode 42 is formed in a zig-zag shape so as to weave between the plurality of second detection electrodes 52, and is disposed coplanarly with the second detection electrodes 52. As such, the third electrode 42 and the second detection electrodes 52 can be collectively disposed on a single layer. Accordingly, the touch panel 5 can be made even thinner than a configuration in which three layers, namely the pyroelectric material layer 50 and the pair of charge detection electrodes 51 and 52, are added. In addition, because the third electrode 42 is formed as a single continuous electrode, the amount of a change in the electrical resistance can be detected in a comparatively simple configuration, which makes it possible to reduce costs by simplifying the resistance detection circuit. Furthermore, the third electrode 42 is separated from the first electrodes 22 and the second electrodes 32 that serve as variable electrostatic capacitance electrodes, which provides a further advantage in that a drop in the accuracy of detecting the pressing force caused by the effects of static electricity can be effectively suppressed.

As described thus far, according to the touch panel 5 of the present embodiment, a high accuracy of detecting a pressing force can be maintained even in the case where the ambient temperature changes, while effectively suppressing an increase in the size and cost of the device as a whole.

Other Embodiments

Finally, other embodiments of the present invention will be described. Note that the configurations disclosed in the following embodiments can be applied in combination with the configurations disclosed by other embodiments as long as there are no conflicts between the two.

Figure 8:
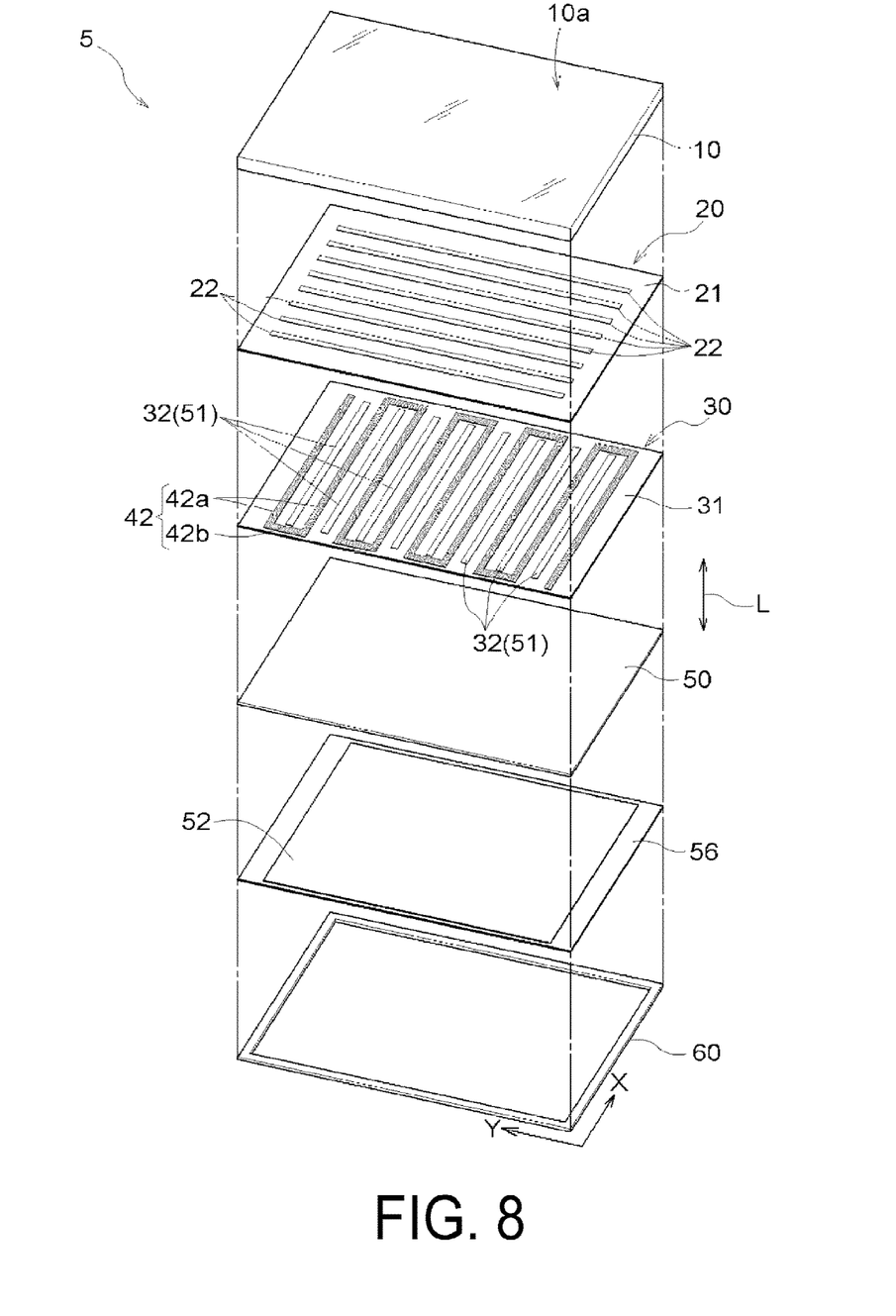
FIG. 8 is an exploded perspective view of another embodiment of the touch panel.

(1) For the above-described embodiment, a description has been given of an example in which, when viewed in plan view, the third electrode 42 is formed in a zig-zag shape so as to weave between the plurality of second detection electrodes 52, and is disposed coplanarly with the second detection electrodes 52. However, the embodiments of the present invention are not limited thereto. For example, as illustrated in FIG. 8, when viewed in plan view, the third electrode 42 may be formed in a zig-zag shape so as to weave between the plurality of second electrodes 32, and may be disposed coplanarly with the second electrodes 32. In this case, the pyroelectric material layer 50 is disposed covering the entirety of the third electrode 42 from the rear surface side of the third electrode 42. It is preferable that the second detection electrodes 52 be formed on a substrate 56 formed of, for example, a polyethylene terephthalate film.

Figure 9:
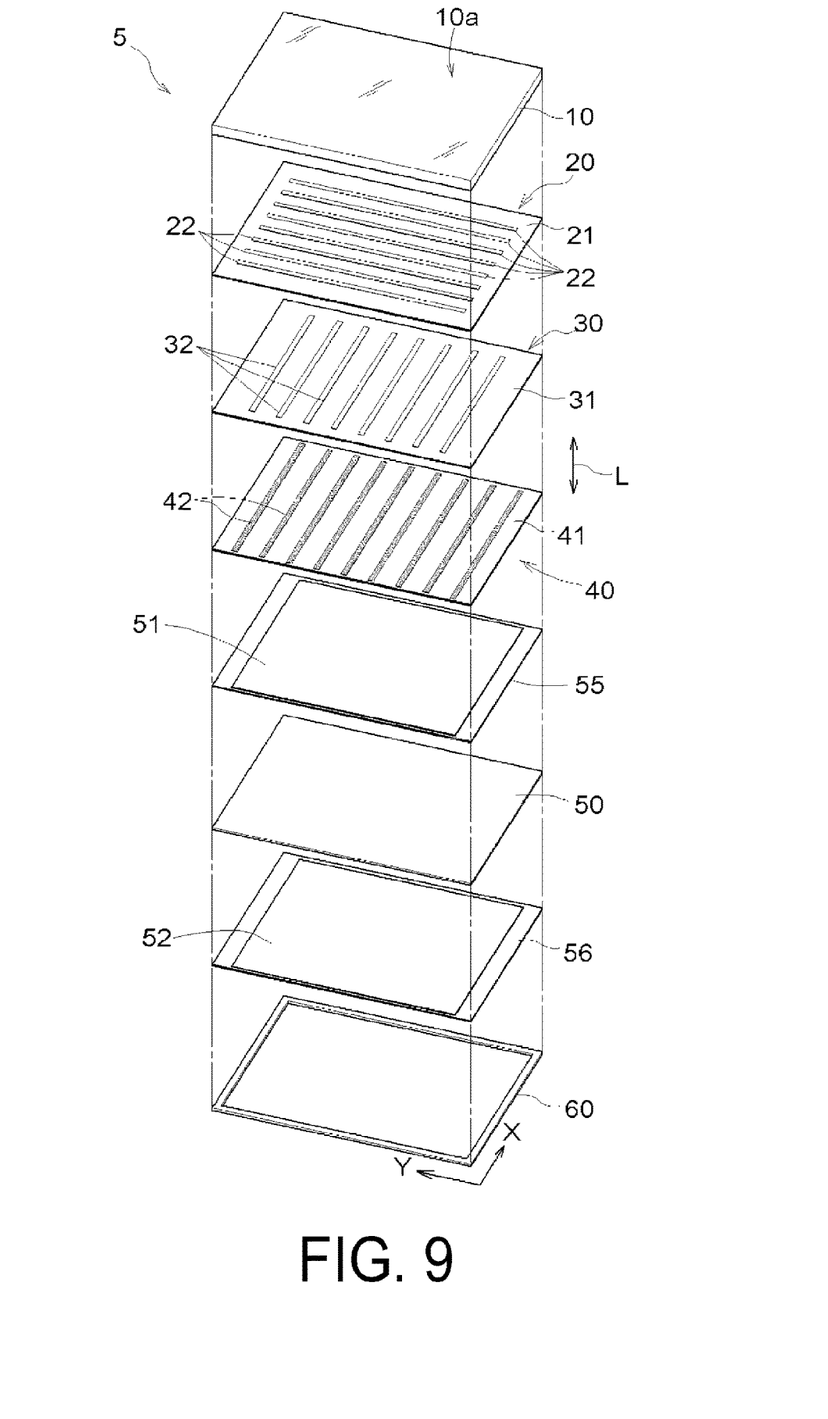
FIG. 9 is an exploded perspective view of yet another embodiment of the touch panel.

(2) For the above-described embodiment, a description has been given of an example in which the plurality of second electrodes 32 are configured to double as the first detection electrodes 51. However, the embodiments of the present invention are not limited thereto. For example, as illustrated in FIG. 9, the first detection electrode 51 and the second electrode 32 may be completely separate elements. In this case, it is preferable that the first detection electrodes 51 be formed on a substrate 55 formed of, for example, a polyethylene terephthalate film. Note that the pyroelectric material layer 50 being "disposed covering the third electrode 42" is in this case a concept that includes being disposed covering the third electrode 42 from the front surface side or the rear surface side thereof, with either of the pair of charge detection electrodes 51 and 52 used as a single set with the pyroelectric material layer 50 being interposed therebetween. Accordingly, the first detection electrode 51 (including the substrate 55) or the second detection electrode 52 (including the substrate 56) may be interposed between the third electrode 42 and the pyroelectric material layer 50. In addition, although the pyroelectric material layer 50 and the pair of charge detection electrodes 51 and 52 on both sides of the pyroelectric material layer 50 are provided on the rear surface side of the third electrode forming member 40 (the third electrodes 42) in the example illustrated in the drawing, these elements may instead be provided between the second electrode forming member 30 (the second electrodes 32) and the third electrode forming member 40 (the third electrodes 42).

(3) For the above-described embodiment, a description has been given of an example in which the first detection electrodes 51 and the second detection electrodes 52 are formed as a plurality of stripe-shaped electrodes disposed parallel to each other at predetermined intervals. However, the embodiments of the present invention are not limited thereto. For example, at least one of the first detection electrode 51 and the second detection electrode 52 may be configured as a single planar electrode covering the entirety of the pyroelectric material layer 50 (see the second detection electrodes 52 in FIG. 8, and the first detection electrode 51 and the second detection electrode 52 in FIG. 9).

(4) For the above-described embodiment, a description has been given of an example in which the third electrode 42 is configured as a single electrode formed in a zig-zag shape when viewed in plan view. However, the embodiments of the present invention are not limited thereto. For example, like the first electrodes 22 and the second electrodes 32, the third electrode 42 may be configured as a plurality of stripe-shaped electrodes disposed parallel to each other at predetermined intervals in the X axis direction or the Y axis direction (see FIG. 9). Such a configuration makes it possible to support multi-force sensing.

(5) In the above-described embodiment, the position determination unit 76 and the pressing force determination unit 77 may be configured to determine the pressed position and the pressing force, respectively, using values that exceed predetermined thresholds. This configuration makes it possible to suppress the occurrence of erroneous inputs based on unintended contact or the like made by the user on the operation surface 10a.

(6) In the above-described embodiment, a description has been given of an example in which the touch panel according to the present invention is applied to a multifunction cellular phone serving as a type of the electronic device 1. However, the embodiments of the present invention are not limited thereto. In addition to a multifunction cellular phone, a conventional cellular phone, a personal digital assistant (PDA), a portable music player, a car navigation system, a portable navigation device (PND), a digital camera, a digital video camera, a mobile gaming device, a tablet, and the like can be given as examples of electronic devices 1. The touch panel according to the present invention can be applied favorably to these electronic devices 1 as well.

Figure 10:
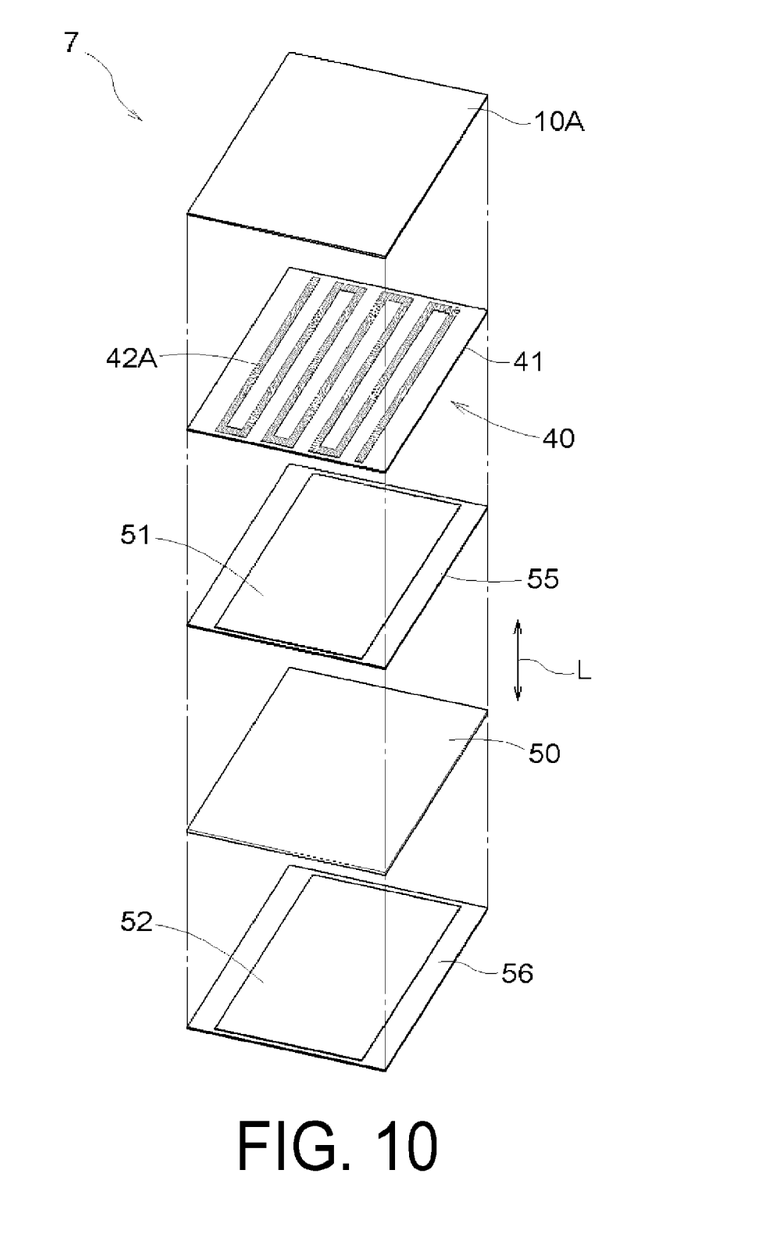
FIG. 10 is an exploded perspective view of a pressure sensitive sensor.

(7) In the above-described embodiment, a description has been give of an example in which the present invention is applied to the pressure sensitive touch panel 5. However, the embodiments of the present invention are not limited thereto. For example, the present invention can also be applied to a device (a pressure sensitive sensor 7) having only a function for detecting a pressing force. In this case, as illustrated in FIG. 10, for example, the pressure sensitive sensor 7 includes: an elastically deformable covering member 10A covering a front surface side; a variable resistance electrode 42A disposed on the rear surface side of the covering member 10A, electrical resistance thereof changing in response to a change in posture; the pyroelectric material layer 50 disposed on the same side of the covering member 10A as the variable resistance electrode 42A, the pyroelectric material layer 50 covering the variable resistance electrode 42A; and the pair of charge detection electrodes 51 and 52 disposed on both sides of the pyroelectric material layer 50 in the layering direction L. Like the touch panel 5 described in the above-described embodiment, this pressure sensitive sensor 7 can also suppress a drop in the accuracy of detecting a pressing force even in the case where the ambient temperature changes. Note that in FIG. 10, elements that correspond to those in the above-described embodiments are given the same reference numerals, and detailed descriptions thereof will be omitted here. In the case of the pressure sensitive sensor 7, the elements do not absolutely have to be transparent. The covering member 10A may, for example, be a protective film formed of a resin.

(8) With respect to other configurations as well, the embodiments disclosed in this specification are to be understood in all ways as exemplary and in no ways as limiting the scope of the present invention. One skilled in the art can easily understand that appropriate modifications can be made without departing from the essential spirit of the present invention. Accordingly, other modified embodiments achieved without departing from the essential spirit of the present invention of course fall within the scope of the present invention.

INDUSTRIAL APPLICABILITY

The present invention can be used in, for example, a touch panel having a function for detecting a pressing force (a pressure sensitive touch panel).

REFERENCE SIGNS LIST

5 Touch panel
7 Pressure sensitive sensor
10 Panel member
10a Operation surface
10A Covering member
22 First electrode
32 Second electrode
42 Third electrode (variable resistance electrode)
42A Variable resistance electrode
50 Pyroelectric material layer
51 First detection electrode (charge detection electrode)
52 Second detection electrode (charge detection electrode)
72 Resistance detection unit
73 Charge detection unit
75 Input determination unit
77 Pressing force determination unit

The invention claimed is:

1. A pressure sensitive sensor comprising:
an elastically deformable covering member covering a front surface side;
a variable resistance electrode disposed on a rear surface side of the covering member, electrical resistance thereof changing in response to a change in posture;
a pyroelectric material layer disposed on the same side of the covering member as the variable resistance electrode, the pyroelectric material layer covering the variable resistance electrode;
a pair of charge detection electrodes disposed on both sides of the pyroelectric material layer in a layering direction;
resistance detection circuitry configured to detect electrical resistance of the variable resistance electrode;
charge detection circuitry configured to detect an amount of a charge produced by self-polarization of the pyroelectric material layer; and
pressing force determination circuitry configured to, on the basis of a detection result from the resistance detection circuitry and a detection result from the charge detection circuitry, correct the detection result from the resistance detection circuitry using the detection result from the charge detection circuitry, and determine a pressing force on the covering member, wherein
the variable resistance electrode is disposed on a side of the pyroelectric material layer opposite from the elastically deformable covering member.

2. A touch panel comprising:
an elastically deformable panel member having an operation surface;
a plurality of first electrodes disposed, on a side of the panel member opposite from the operation surface, parallel to each other in an X axis direction at predetermined intervals, the first electrodes changing in self capacitance or mutual capacitance in response to an object to be detected approaching/receding;
a plurality of second electrodes disposed, on a side of the first electrodes opposite from the panel member, parallel to each other at predetermined intervals in a Y axis direction intersecting with the X axis direction, the second electrodes changing in self capacitance or mutual capacitance in response to the object to be detected approaching/receding;

a variable resistance electrode disposed on the side of the first electrodes opposite from the panel member, electrical resistance thereof changing in response to a change in posture;

a pyroelectric material layer disposed on a side of the second electrodes opposite from the first electrodes, the pyroelectric material layer covering the variable resistance electrode; and a pair of charge detection electrodes disposed on both sides of the pyroelectric material layer in a layering direction.

3. The touch panel according to claim 2, wherein the plurality of second electrodes are configured to double as first detection electrodes, which are one of the pair of charge detection electrodes.

4. The touch panel according to claim 3, wherein second detection electrodes, which are the other of the pair of charge detection electrodes, are configured as a plurality of electrodes disposed parallel to each other at predetermined intervals, and the variable resistance electrode is, when viewed in the layering direction, formed in a zig-zag shape so as to weave between the plurality of second detection electrodes and is disposed coplanarly with the second detection electrodes.

5. The touch panel according to claim 2, wherein the variable resistance electrode is, when viewed in the layering direction, formed in a zig-zag shape so as to weave between the plurality of second electrodes and is disposed coplanarly with the second electrodes.

6. The touch panel according to claim 2, further comprising:

resistance detection circuitry configured to detect electrical resistance of the variable resistance electrode;

charge detection circuitry configured to detect an amount of a charge produced by self-polarization of the pyroelectric material layer; and input determination circuitry configured to, on the basis of a detection result from the resistance detection circuitry and a detection result from the charge detection circuitry, correct the detection result from the resistance detection circuitry using the detection result from the charge detection circuitry, and determine a pressing force on the operation surface.

* * * * *